United States Patent Office 3,396,458
Patented Aug. 13, 1968

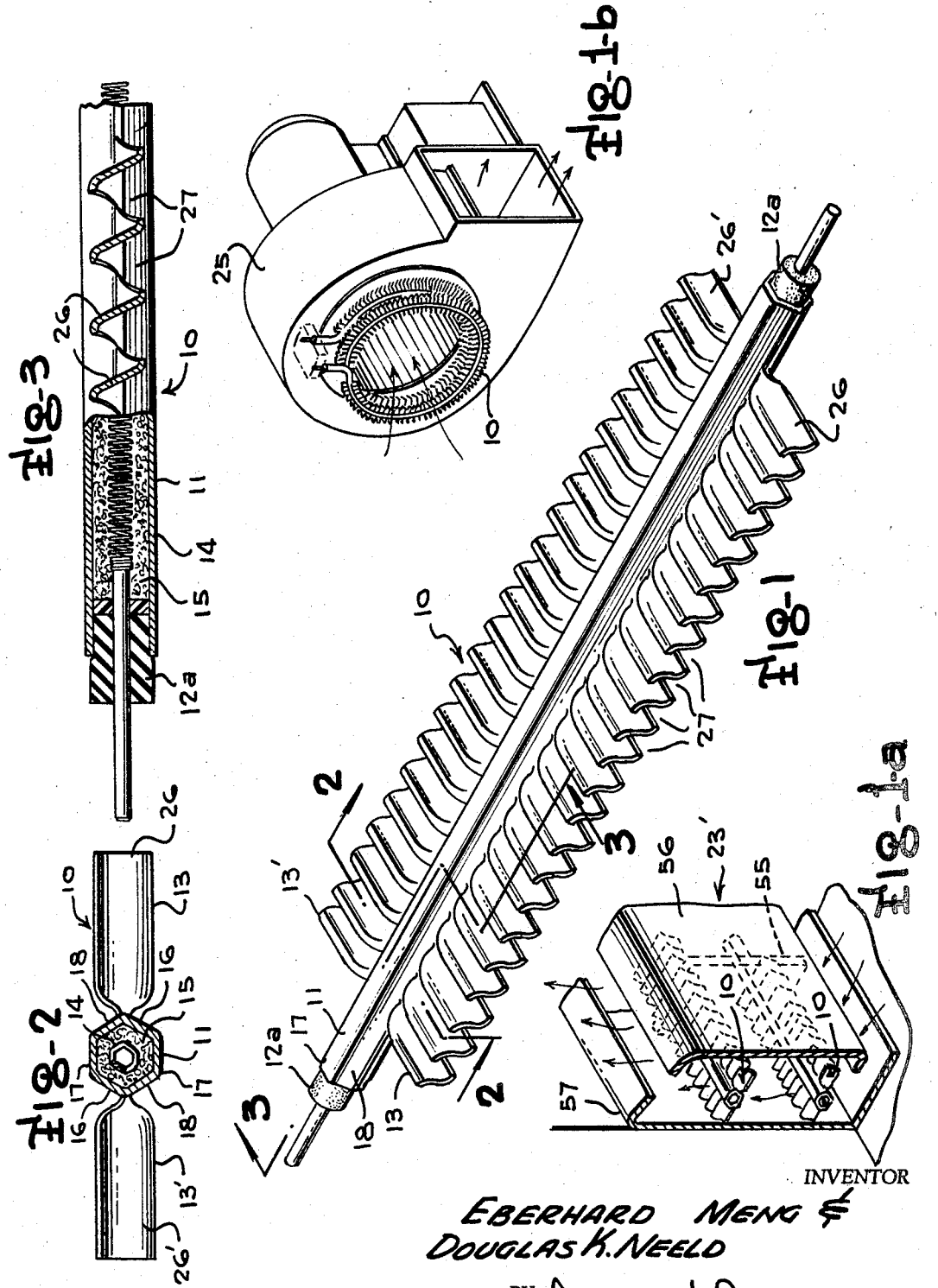

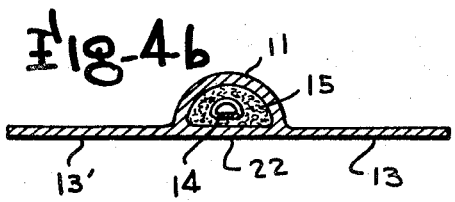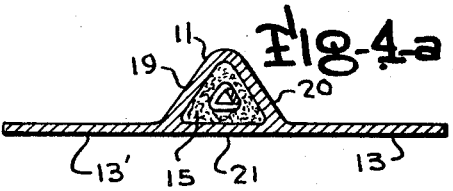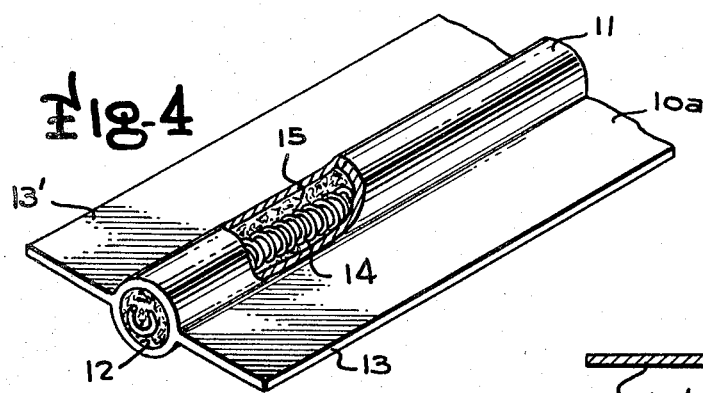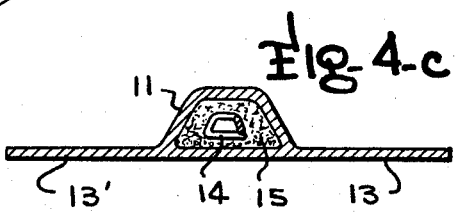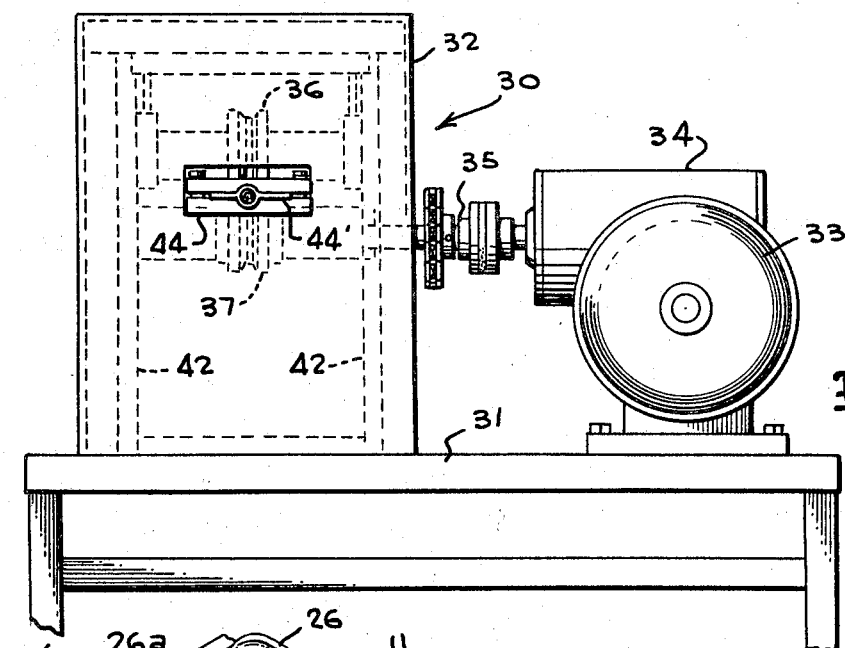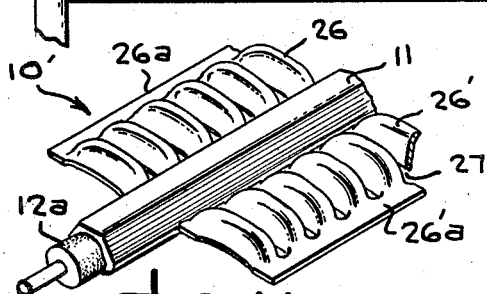

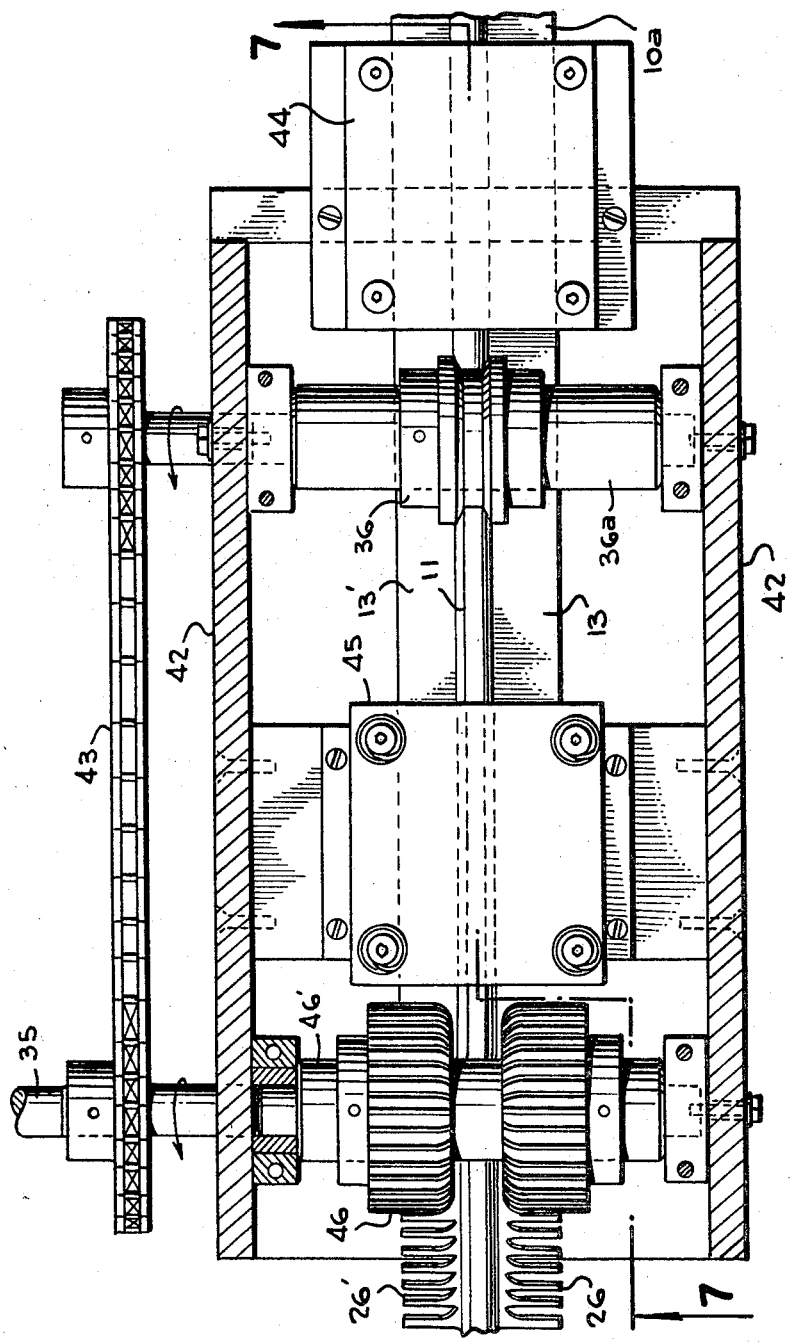

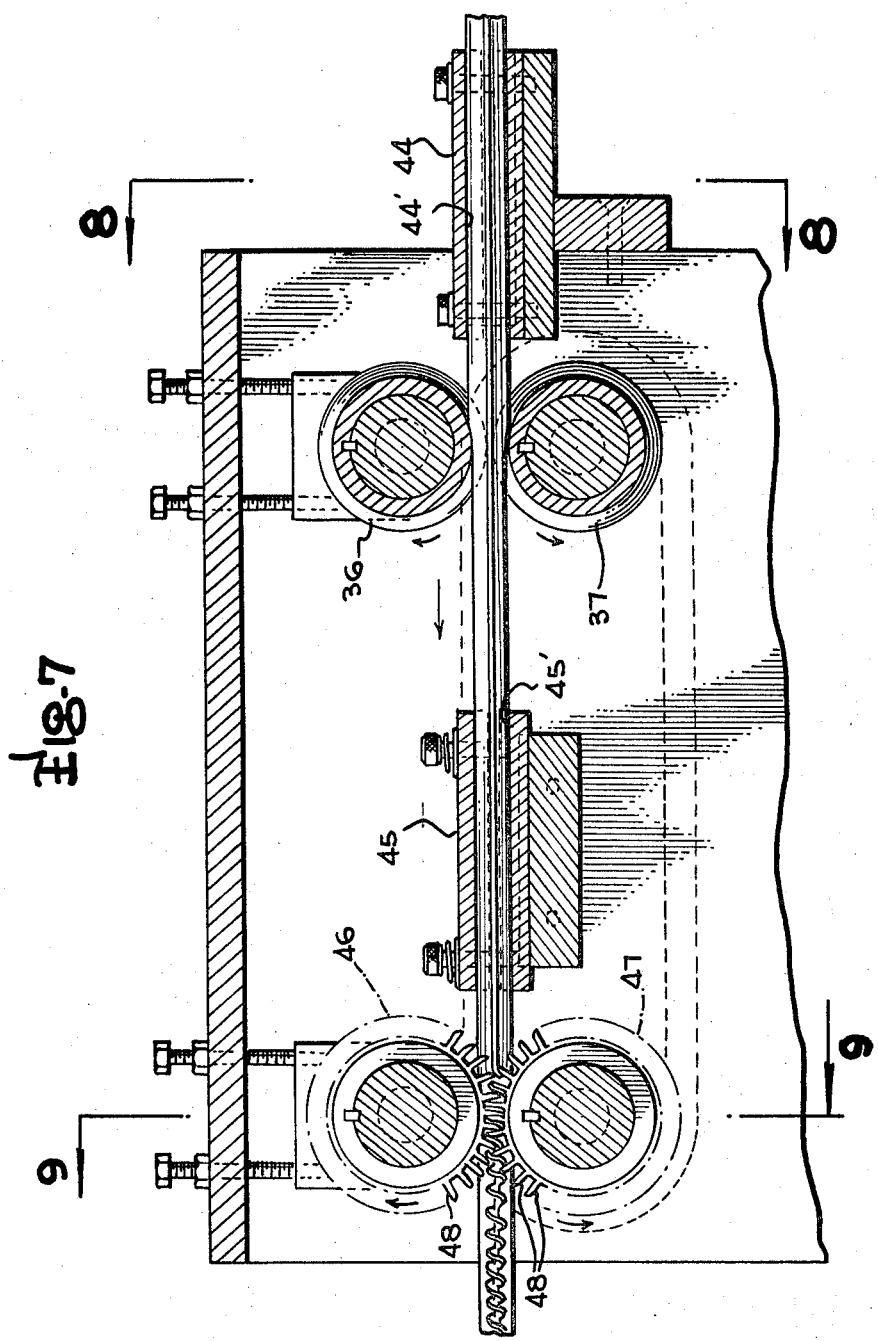

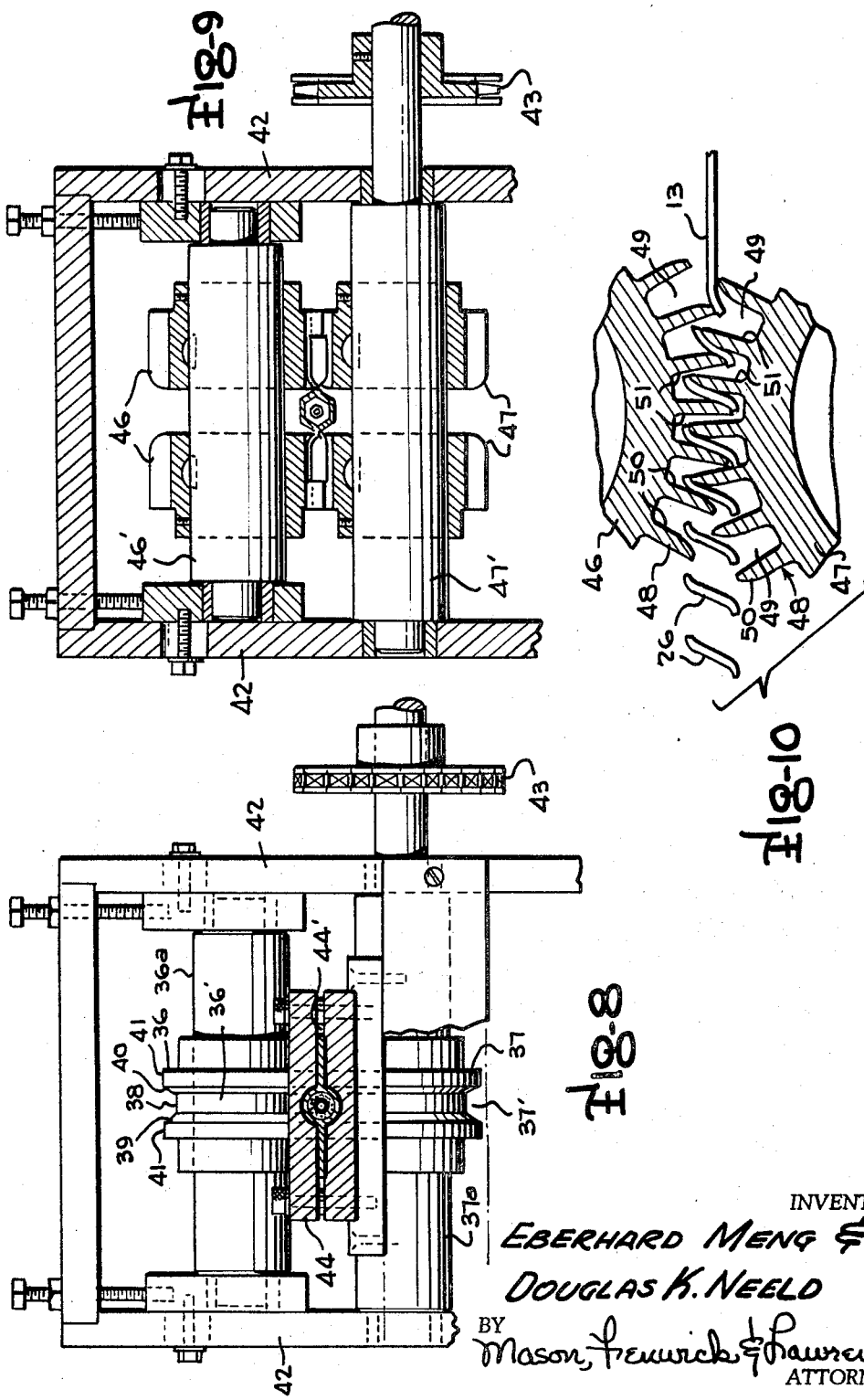

3,396,458
ELECTRICAL HEATING ELEMENTS AND METHOD AND APPARATUS FOR MAKING THE SAME
Eberhard Meng, Cottage City, and Douglas K. Neeld, Silver Spring, Md., assignors to Electro-Therm, Incorporated, Laurel, Md., a corporation of Maryland
Filed Mar. 28, 1966, Ser. No. 537,826
3 Claims. (Cl. 29—615)

ABSTRACT OF THE DISCLOSURE

A method of forming finned electrical heating elements from extruded metal stock having a central tube portion of circular cross section and fins projecting radially outwardly therefrom in a diametric plane of the tube portion integral with the latter, by loading the bore of the tube portion with resistance wire and granular insulating material, closing the ends of the bore, passing the tube portion into rolling contact with confronting die surfaces to reshape the cross-sectional configuration of the tube portion to nonround cross-section having a straight side paralleling the longitudinal axis of the bore and providing at least about a 10% reduction in cross-sectional area, and cutting through and twisting the fins to provide plural fin segments arranged substantially in parallel planes inclined to the axis of the tube portion.

---

The present invention relates in general to methods and apparatus for forming electric heating elements especially adapted for use in air heating applications and to the product of said methods, and more particularly to electric heating elements and method and apparatus for making the same, of the type comprising a tubular metallic sheath surrounding electric resistance wire embedded in a compacted mass of granular insulating material within the sheath wherein the sheath is provided with heat dissipating vane or fin formations extending from diametrically opposite portions of the sheath long at least the major portion of the length of the heating element.

Electric heating elements have been commonly constructed by locating an elongated electric resistance wire, such as a spiral wound nichrome wire or the like, within a tubular metallic sheath of circular cross-section in inwardly spaced relation to the sheath walls, filling the sheath and resistance wire assembly with a granular insulating material, plugging the ends of the sheath with terminal members on the ends of the resistance wire protruding from the plugged ends, and constricting the sheath radially inwardly in a manner preserving its circular cross-section to compact the granular insulating material into a dense, hard mass within the sheath. Such conventional heating elements were primarily designed for use in surface heating units and oven heating units in electric stoves and as heating elements for liquid vessels such as hot water heaters, electric urns, fry kettles, and the like. However, they have also found considerable application in air or space heater applications, such as in electric baseboard heaters and air circulating heaters of many different descriptions, wherein a fan or blower propels air through a network of selectively configurated portions of such a heating element. However, the amount of heat transferred to the air by the circular cross-section sheathed heating element in such air or space heaters is limited due to the restricted surface area of the sheath and the consequent relatively low heat dissipation to air.

U.S. Patent Nos. 1,494,939 and 1,614,168 to C. C. Abbott recognized this limitation of circular cross-section heating elements and proposed the provision of diametrically oppositely radiating flat vanes of metallic material associated in thermally conductive relation with the conventional circular cross-section sheathed heating element by clamping two sheet metal plates about the heating element sheath, one of which has a central U-shaped groove or both of which have inwardly concave semi-cylindrical grooves, of sufficient size to accommodate the heating element sheath in contacting relation therein. These plates are welded together to clamp the heating element tightly therebetween. Such a composite construction, of course, involves all of the usual steps and procedures customarily employed to produce the circular cross-section sheathed heating element and in addition requires the shaping of the two vane-forming plates, the assembly of the two plates onto the sheathed heating element, and the welding of the two plates together to complete the assembly. Also, when the vane-forming plates and the heating element sheath are separately produced elements, it is extremely difficult to insure such intimate contact between the heating element sheath and the whole adjacent surface area of the concave grooves in the vane-forming plates as to avoid substantial thermal resistance or inefficiency of thermal transfer across the interface between these surfaces.

An object of the present invention, therefore, is the provision of a novel method and apparatus for making sheathed electric heating elements for air and space heaters and the like wherein the heating element is provided with a pair of diametrically oppositely projecting vanes or fins formed integrally with the material forming the central sheath portion and interrupted by multiple air passage slots bounded by twisted flat fin segment-forming substantially flat surfaces facing the passages.

Another object of the present invention is the provision of a novel method and apparatus for making electric heating elements of the type including a resistance wire embedded in a mass of granular insulating material encased within a hollow metallic sheath having diametrically oppositely projecting vanes or fins integral with and extending from the wire-encasing central portion of the sheath along the length thereof providing multiple radially elongated air passage slots along the fins bounded by flat fin segment surfaces of extended width relative to the fine thickness facing the passages, wherein the wire-encasing central portion of the sheath is reshaped after loading of the same with the wire and insulating material to constrict the effective internal area thereof and compact the insulating material into a dense, hard mass.

Another object of the present invention is the provision of a novel method and apparatus for making electric heating elements as described in the preceding paragraph, wherein the vanes or fins are produced from planiform flanges extending longitudinally of the heating element in a single diametric plane by cutting and deforming each of the flanges into a series of narrow fin elements substantially disposed in parallel planes inclined to the longitudinal axis of the heating element and spaced apart by intervening air passage zones.

Another object of the present invention is the provision of a novel method and apparatus for making electric heating elements as described in the immediately preceding paragraph, wherein the cutting and deforming of the flanges is effected immediately following reshaping of wire-encasing central portion of the sheath in a single machine as a single processing operation.

Other objects, advantages and capabilities of the present invention will become apparent from the following detailed description, taken in conjunction with the accompanying drawings illustrating preferred embodiments of the invention.

In the drawings:

FIGURE 1 is a perspective view of a length of the heating element embodying the present invention;

FIGURE 1a is a fragmentary perspective view of a baseboard radiator structure containing the heating element of the present invention;

FIGURE 1b is a somewhat diagrammatic perspective view with parts broken away, of a scroll-type blower having heating element of the present invention therein;

FIGURE 2 is a transverse section view thereof taken from the line 2—2 of FIGURE 1;

FIGURE 3 is a longitudinal section view thereof taken along the line 3—3 of FIGURE 1;

FIGURE 4 is a perspective view of the heating element after loading the same with insulating material but before reshaping thereof;

FIGURES 4a, 4b and 4c are transverse section views of other reshaped forms of the central sheath portion which may be produced;

FIGURE 5 is a feed end elevation of apparatus which may be used to reshape the heating element;

FIGURE 6 is a top plan view thereof with the cover of the forming head removed;

FIGURE 7 is a longitudinal section view taken along the line 7—7 of FIGURE 6;

FIGURES 8 and 9 are transverse section views taken along the lines 8—8 and 9—9, respectively, of FIGURE 7;

FIGURE 10 is a diagrammatic fragmentary section view illustrating the action of the forming gears in cutting and shaping the fin segments; and FIGURE 11 is a fragmentary perspective view of a modified form of the heating element.

Referring to the drawings wherein like reference characters designate corresponding parts throughout the several figures, the heating element of the present invention, designated by reference character 10 and illustrated in FIGURES 1, 2 and 3 in its final configuration and form after processing in accordance with the method and apparatus hereinafter described, is formed from an extruded finned sheath 10a shown in FIGURE 4 having a central sheath portion 11 which is initially of true circular cross-section provided with a circular cross-section bore 12 running the length thereof and a pair of integral, oppositely projecting fin formations or flanges 13, 13' of planiform configuration alined symmetrically with a diametric plane through the center of the sheath portion 11. For example, the extrusion 10a may be formed of aluminum alloy, and have a wall thickness of .035 inch, an outer diameter at the circular cross-section sheath portion 11 of about ⅜ inch, a maximum transverse dimension between the outer free edges of the fins 13, 13' of 1½ inch, and a fin thickness of .035 inch, as one practical example.

The extrusion 10a, as in the case of conventional circular cross-section sheaths for heating elements, is cut or supplied in rectilinear sections of appropriate length for the conventional machines used for loading the granular insulating material into heating element sheaths, and the usual helical resistance wire 14, having terminal conductor members 14' joined as by welding to its opposite ends, is positioned in the bore 12 with the terminal members of the wire projecting from the opposite ends of the bore 12. One end of the bore 12 is plugged by the usual plug 12a on the terminal member of the resistance wire, the bore 12 is loaded with the granular insulating material 15, such for example as magnesium oxide or aluminum oxide, in the usual manner, and the other end through which the insulating material was introduced is similarly plugged to close the same. The procedure thus far described is the same as that followed in connection with processing conventional circular cross-section heating element sheaths. However, in the case of the circular cross-section sheath, the next step of compaction or densification of the granular insulation material to produce the dense hard mass of insulation within the bore of the sheath spacing and insulating the resistance wire from the sheath walls, which is usually carried out by simply passing the sheath through rollers or a die shaped to uniformly constrict the circular cross-section sheath radially inwardly and thereby compact the insulating material while maintaining the circular cross-section configuration, or to successively deform the sheath into elliptical configuration to constrict the same, as described in U.S. Patent No. 2,677,172 cannot be performed in the conventional way with the extrusion 10a due to the integral fins or flanges 13, 13' projecting therefrom.

To effect appropriate compaction of the insulating material, a reduction in the area of the bore 12 of at least about 10% is necessary. However, simply compressing inwardly the free portions of the sheath wall disposed between the fins while leaving the sheath wall portions immediately adjoining the roots of the fins undisturbed, producing a somewhat elliptical cross-section, would not produce the necessary percentage reduction in area if done to a moderate extent. If such inward distortion of these free sheath wall regions were carried out to the severe extent necessary to achieve the required at least 10% area reduction, the spacing between the sheath wall and the resistance and therefore the thickness of insulating material between the wire and sheath wall, varies to such an extent circumferentially of the sheath portion, as to produce intolerable nonuniformity of heat transfer to the sheath walls at points along the perimeter of the central sheath portion. This would produce relatively greater heating in some regions of the sheath wall and less heating at other regions, causing "hot spots" or heat gradients along the heating element which would render it unsuitable for many heating installations.

The densification or compaction of the granular insulating material in the bore 12 of the finned or flanged extrusion 10a is achieved by passing the central sheath portion through die rollers to change the shape thereof from its initial circular cross-section configuration to certain shapes, such for example as a semi-circle, a triangle, a hexagon or a semi-hexagon (or isosceles trapezoid), having an internal cross-section area within the sheath walls which is less than the area of the initial circular cross-section bore 12 by an amount comparable to the reduction in area normally achieved by uniform radial constriction of circular cross-section sheaths. Preferably the non-circular cross-section sheath portion is formed in a hexagon which is substantially inscribed in the circle defined by the initial configuration of the outer surface of the circular cross-section sheath portion, whereby the corners of the hexagon lie in the path of this initially defined circle. The reduction in area thus accomplished produces appropriate compaction of the insulating material approximately equal to that previously produced by the radial constriction of the sheath. Such a reshaped, hexagonal central sheath portion is illustrated in FIGURES 1 and 2, the sheath portion having three substantially equal straight sides 16, 17 and 18 to each side of the diametric plane of the fins 13, 13' through the center axis of the bore 12, defining substantially 120° angles to each other at their corners, and compacting the granular insulating material 15 in the bore 12 into a dense mass of appropriate hardness. This configuration permits one to use grooves of very simple form in the die rollers, since the grooves need only be of truncated V-shaped cross-section wherein the outwardly divergent side walls and the base wall are of the same cross-sectional length, and has been found to provide sufficiently uniform distribution of insulation thickness to produce substantially uniform heat transfer to the sheath walls. This is thought to be due to the resistance wire helix assuming a path which, when viewed from an end of the sheath, approximates the hexagonal configuration of the central sheath portion.

It has been found that other configurations for the central sheath portion also produce sufficient percentage reduction in bore area to provide the required compaction of the granular material without producing such severe variations in insulation thickness as to create noticeable non-uniform circumferential distribution of heat transfer to the sheath wall. Examples of these are the substantially triangular cross-section illustrated in FIGURE 4a, providing angle-defining sides 19 and 20 to one side of the diametric fin plane and flat side 21 to the other side thereof, the semi-circular configuration illustrated in FIGURE 4b, wherein the sheath portion to only one side of the diametric fin plane is flattened as indicated at 22, and the semi-hexagonal configuration shown in FIGURE 4c. In each case, the particular configuration shown appears to be one which the helix of the resistance wire 14 can substantially assume responsive to the pressure of the granular insulating material produced during compaction to maintain the spacing between the helix and the sheath wall substantially uniform and thereby avoid significant variation in heat transfer therethrough along different radial directions.

Significantly increased heat transfer to the air for heating the space to be served is achieved by cutting and deforming the fins to produce a series of relatively narrow, flat fin segments, indicated at 26, 26' in the drawings, which are spaced uniformly from each other along the longitudinal axis of the heating element and are inclined in parallel planes forming uniform acute angles with the longitudinal axis of the heating element. The corresponding fin segments 26 and 26' on both fins 13, 13' may be inclined in the same plane or the fin segments 26 of one fin 13 may be disposed in one set of parallel planes inclined at a given angle to the longitudinal axis and the fin segments 26' of the other fin 13' may be disposed in a set of parallel planes inclined at similar angles to the longitudinal axis but in an opposite direction relating to the fin segments 26. Such fin segments 26, 26' provide a multitude of air passages 27 between successive fin segments for flow of air along paths paralleling the plane of the fin segments which significantly increases heat transfer to the air flowing through the passages.

An exemplary form of apparatus for reshaping the central sheath portion of the heating element of the present invention, and if desired for also forming the inclined fin segments 26, 26' from the fins, in an efficient and commercially practicable manner is illustrated in FIGURES 5 to 9 of the drawings. Such apparatus, generally designated by the reference character 30, may be supported on a suitable frame base or platform 31 to locate the apparatus at a convenient height for the operator and comprises a forming head unit 32 and an electrical motor 33, having a transmission or gear reduction unit 34 coupled to the shaft of the motor 33 and reducing the output thereof from, for example, about 1750 r.p.m. to about 58 r.p.m. to provide a suitable driving torque on the drive shaft 35 coupled to one of a pair of die rollers 36, 37 journalled in the forming head unit 32. In the preferred embodiment the die rollers 36, 37 are each formed of identical rollers having a truncated V-shaped groove 36', 37' in its periphery defined by a bottom groove surface 38 and similarly outwardly divergent side surfaces 39, 40 disposed at angles of substantially 130° to the bottom surface, the grooves being flanked by cylindrical surfaces 41 of a diameter so related to the vertical spacing between the centers of the two rollers 36, 37 as to space the corresponding surfaces 41 of rollers 36 and 37 a vertical distance equal to the transverse thickness of the fins 13, 13' whereby the surfaces 41 engage the fins 13, 13' and frictionally drive the heating element extrusion between the rollers 36, 37 along the feed path indicated by arrow in FIGURE 7. As the central sheath portion 11 passes into the pair of vertically alined truncated V-shaped grooves 36', 37', the circular cross-section sheath portion is reshaped to the hexagonal cross-section configuration illustrated in FIGURES 1–3, substantially inscribed in the circle defined by the outer surface of the circular sheath portion 11, to produce the desired compaction of the granular insulating material 15 in the bore 12. The die rollers 36, 37 may be coupled together and to the drive shaft 35 in any conventional manner to coordinate rotation thereof, for example the two rollers may be keyed on parallel shafts 36a, 37a which are journalled in side plates 42 or other members of the head unit 32 and have like pinion gears thereon meshing with each other, with the lower shaft 37a coupled by a chain and sprocket drive 43 to drive shaft 35. Guide blocks 44 and 45 are provided fore and aft of the die rollers 36, 37 along the feed path to stabilize the heating element extrusion 10a during forming thereof, each being mounted on cross support bars or the like and having an opening 44', 45' therethrough of appropriate cross-section to receive and guide the extrusion. For example, inlet guide block 44 may have an opening 44' of the cross-sectional shape shown in FIGURE 5 conforming to the shape of the initial extrusion 10a but wherein the radial length of the fin receiving portion is somewhat enlarged to receive extrusions with different size fins, and the opening 45' of guide block 45 may be of similar configuration or the central zone thereof which receives the central sheath portion 11 may be of hexagonal configuration.

It will be appreciated that if finned sheaths of triangular, semicircular, or semihexagonal cross-sectional configuration are to be formed, the peripheries of die rollers 36, 37 will be appropriately modified, as by providing the lower die rollers 37 with an uninterrupted cylindrical surface of the diameter of surfaces 41 to flatten the central sheath portion 11 to one side of the diametric fin plane, the other die roller 36 having a V-shaped groove, a truncated V-shaped groove, or a semicircular groove as the case may require.

In order to cut and deform the fins into the segments and inclined fin arrangement illustrated, additional cutting and shaping roller means, such as the upper and lower rollers or forming gears 46, 47 may be provided in the forming head unit 32 near the outlet end thereof spaced along the feed path in the direction of travel from the guide block 45. Each of the forming gears 46, 47 may take the forms of a pair of axially spaced like gear wheels, spaced symmetrically to each side of the vertical center of the feed path a distance to accommodate the central sheath portion therebetween, keyed on shafts 46', 47' journalled in the side plate 42 with the lower shaft 47' projecting therethrough. The peripheries of the gears 46, 47 are provided with inclined cutting and shaping teeth 48 inclined to radii of the gears and spaced circumferentially by channels 49 to cut the fins 13 from adjacent the roots thereof through the outer edges along parallel lines spaced apart longitudinally the desired width of the fin segments, the inclined surfaces 50 of the teeth 49 then forcing the fin segments to the desired inclination to the longitudinal axis. The meshing of the teeth of the gears 46, 47 coordinates rotation of the respective forming gears, and the forming gears are driven in the preferred embodiment by a direct connection between the shaft 47' and the drive shaft 35, one sprocket of the chain and sprocket drive 43 being keyed on the portion of shaft 47' projecting outwardly beyond one of the side plates 42 to couple the driving torque to the die rollers 36, 37.

In the operation of the above described apparatus an extrusion 10a, such as that shown in FIGURE 4, after the same has been loaded with the resistance wire 14 and granular insulating material 15, is fed through the opening 44' of the inlet guide block 44 until the circular cross-section sheath portion passes into the truncated V-shaped grooves 36', 37' of the die rollers 36, 37. The configuration of the grooves 36', 37' reshapes the portions of the central sheath portion of the extrusion 10a to conform to the cross-sectional configuration of the groove, thus reshaping the central sheath portion to a hexagonal cross-section inscribed within the circle defined by the outer surface of the central sheath portion. The cylindrical surface 41 of the die rollers 36, 37 are spaced sufficiently to permit the fin formations 13, 13' of the extrusion to pass therebetween without being deformed, the frictional engagement of the surface of the die rollers with the confronting surface portions of the extrusion serving to assist or effect feeding of the extrusion along the feed path. The extrusion, upon leaving the bight of the pair of rollers 36, 37 is then fed through the opening 45' of the aft guide block 45, and if cutting and forming of the fins 13, 13' is to be effected the extrusion is then passed into engagement with the forming gears 46, 47. The sharp corner portions of the teeth 49 of forming gears 46, 47 at the outer ends of the radial surface 51 thereof effecting shearing action on the fin formations 13, 13' as the teeth approach and enter into meshing relation to each other, producing cuts in the fins extending from near the roots thereof through the outer edges, after which the inclined surface 50 of the intermeshing teeth twist the fin segments thus forming into inclined planes as illustrated in FIGURES 1 and 3, after which the extrusion is discharged from the forming gears. With the particular shapes of the teeth of the forming gears herein illustrated slight curves are formed in the lateral edges of each fin segment producing a somewhat sinuous configuration of the fin segments.

The finned heating element is well suited to use as the heating element of a baseboard radiator. To incorporate the heating element 10 in a baseboard radiator, for example such as one of the type indicated at 23' in FIGURE 1a, the finned heating element having the hexagonal sheath portion may be cut to correspond to the length of the baseboard radiator housing required to give the amount of heating computed to be appropriate to the particular room to be served. Alternatively, the finned heating element with the hexagonal cross-section sheath may be some multiple of the length of the baseboard radiator of heat exchanger unit in which it is to be installed, with 180° bends of moderate radius capable of being assumed by the heating element being formed at an appropriate place or places along the length thereof to form a U-shaped heating element or a substantially sinuous heating element having plural parallel straight runs approximating the length of the radiator or heat exchanger. In such an installation, the heating element 10 may be supported in parallel, horizontal stacked form on a conventionally supported plate or the like 55 by the front panel 56 and back panel 57 of a baseboard radiator of any conventional configuration.

The finned heating element 10 may also be bent into a circular or spiral pattern as illustrated in FIGURE 1b and disposed in a circular cross-section inlet duct of a scroll type blower, or in a circular cross-section outlet of a fan or other air circulating device, to facilitate heating of the air passing in heat exchange relation therewith. In either case, the segmented fins of the heating element provide for an extended heated surface in intimate heat transfer relation with the air or other fluid medium to be heated which markedly increases the efficiency of heat transfer from the resistance wire to the air or fluid medium to be heated.

Where severe bends are required, however, as where the heating element must be bent along a curved path of very small radius, for example a radius of about 1½ inches or less, it may be preferable to use the semicircular, triangular or semihexagonal cross-sections for the central sheath portion, in each of which the flat side provided to one side of the diametric fin plane may be disposed facing toward the center of curvature of the required bend and the heating element then bent to assume the desired small radius path, or the fins may be cut off in the zone of the bend to facilitate achievement of the desired small radius.

It will be appreciated that a multiple sheath section finned heating element can be produced in a similar manner by providing an extrusion with two or more parallel circular cross-section sheath portions like the sheath portion 11, with outwardly radiating coplanar fins and a web of similar thickness interconnecting adjacent sheath portions. In such a case, the number of sets of die rollers 36, 37 or the number of grooves on the die rollers would be appropriately increased to form each of the sheath portions to the desired hexagonal cross-section, and the number of forming gears 46, 47 would be similarly increased to form the inclined fin segments in the outboard fins and in the intervening web between the sheath portions.

Instead of cutting the fins from adjacent the fin roots entirely through the outer edges thereof to form the inclined fin segments 26, 26' and intervening air passages 27, the structural integrity of the heating element may be increased by shortening the length of the cuts formed by the gears 46, 47 so that they terminate just inwardly of the outer edges of the fins, leaving a narrow region of the outer fin edges intact. This is accomplished simply by making the axial length of the cutting and forming surfaces of the gears 46, 47 slightly less than the width of the fins and so locating them relative to the feed path of the extrusion as to terminate the cuts, and consequently the air passages, formed thereby slightly inwardly of the outer edges of the fins. This results in a heating element of the construction indicated at 10' in FIGURE 11, which is like that illustrated in FIGURE 1, except that an uninterrupted free edge portion 26a, 26'a outwardly bounds the air passages 27.

Also, instead of providing a unitary extrusion 10a having an integrally formed sheath portion and fins, the heating element may be formed of a pair of shaped sheet metal strips or extrusions having a semicylindrical formation near one edge thereof, bounded by a narrow fin or flange along said one edge and a wider fin or flange of the width of flange 13 extruding from the diametrically opposite part of the semicylindrical formation. A pair of such strips may then be arranged with the semicylindrical formations in registry with each other in oppositely curving relation to collectively form a circular cross-section sheath portion and the roots of the narrow fin of one strip and of the wider fin of the other strip welded together to complete the sheath and fin assembly. This assembly may then be loaded and reshaped in the same manner as the extrusion 10a to form the finning heating element.

While several embodiments of the present invention have been particularly shown and described, it will be apparent that other modifications may be made therein, within the spirit and scope of the invention, and it is desired, therefore, that only such limitations be placed on the invention as are imposed by the prior art and set forth in the appended claims.

We claim:
1. The method of forming a finned electrical heating element from extruded metal stock in the form of a unitary, integral member having an central tube portion of circular cross-section and lateral external longitudinal planiform fins projecting radially therefrom in a diametric plane of the tube portion along continuous straight lines parlleling the axis of the tube portion, comprising the steps of disposing in the bore of said tube portion an elongated resistance wire unit of sufficient length to project from the opposite ends of said bore, loading said bore with granular insulating material from end to end to surround the resistance wire unit and space all portions thereof from the internal surface of said tube portion, closing the ends of said bore to prevent escape of the granular insulating material therefrom, passing said tube portion of said members along a feed path into rolling contact with confronting channel defining die surfaces at a single tube shaping station exerting inwardly deforming pressure on both outwardly convex substantially semicircular halves of said tube portion extending opposite from said diametric plane for reshaping the cross-sectional configuration of said tube portion to a non-round cross-sectional configuration having a straight side paralleling said lon- gitudinal axis which can be inscribed in the circle defined by the initial cross-sectional configuration of said tube portion, such reshaping producing a reduction in the cross-sectional area of said bore of at least about 10% sufficient to compact said granular insulating material to a dense hard mass while maintaining sufficient uniformity of spacing between the tube portion and said resistance wire unit to provide substantially uniform heat distribution over all parts of said tube portion, cutting through said fins along parallel lines extending in directions away from said axis from immediately adjacent the juncture of the fins with the tube portion over the major portion of the width of said fins to subdivide the fins into a series of fin segments spaced serially along the direction of said axis, and twisting the fin segments between each successive pair of cuts to dispose the major portions of said fin segments in parallel planes inclined to the axis of said tube portion providing air passages between successive fin segments for flow of air along paths paralleling said planes.

2. The method defined in claim 1, wherein each successive pair of said cuts in said fins are spaced longitudinally a distance which is many times the thickness of the fins to provide wide fin segment surfaces facing toward said air passages of substantial area for thermal exchange with air flowing through said passages.

3. The method defined in claim 2, wherein the cutting of said fins is effected by making cuts therein along straight lines lying perpendicular to said axis, each extending from immediately adjacent the juncture of the fins and tube portion to a point spaced slightly inwardly from the outer edges of the fins to provide a narrow uninterrupted outer edge portion along each fin.

References Cited
UNITED STATES PATENTS

| | | | |
|---|---|---|---|
| 1,786,571 | 12/1930 | Lonsdale | 29—157.3 |
| 2,019,913 | 11/1935 | Kotrbaty | 219—540 |
| 2,786,125 | 3/1957 | Drugmand et al. | 338—238 X |
| 2,933,805 | 4/1960 | McOrlly | 338—238 X |
| 2,944,138 | 7/1960 | Goff | 219—540 X |
| 2,963,779 | 12/1960 | Mosgard-Jensen | 29—157.3 |
| 3,061,808 | 10/1962 | Wiegand | 338—238 X |
| 3,132,230 | 5/1964 | Laug | 219—366 |
| 3,233,074 | 2/1966 | Smith. | |
| 3,333,317 | 8/1967 | Shockley | 29—157.3 |

JOHN F. CAMPBELL, *Primary Examiner.*

J. L. CLINE, *Assistant Examiner.*